United States Patent Office 3,038,305
Patented June 12, 1962

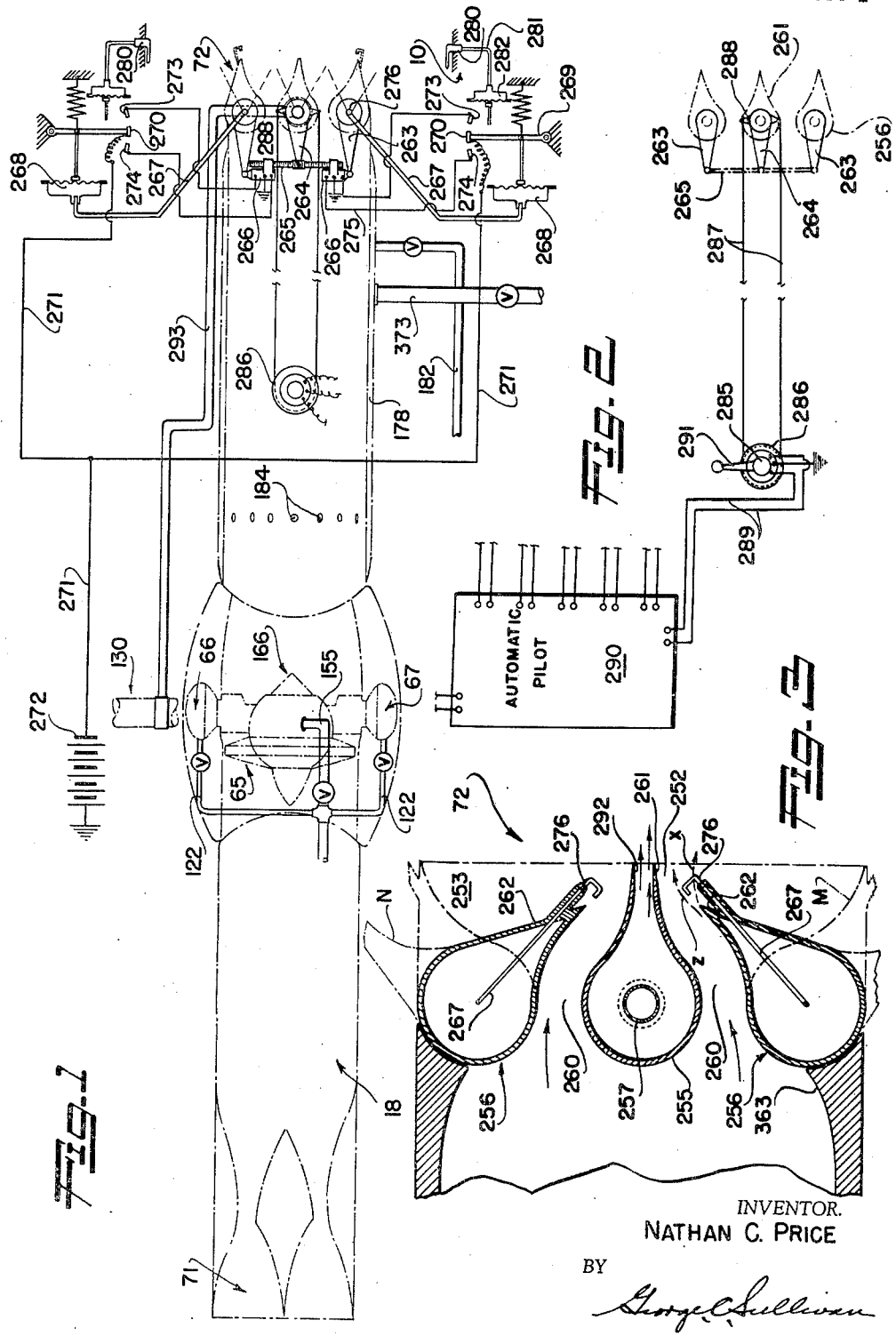

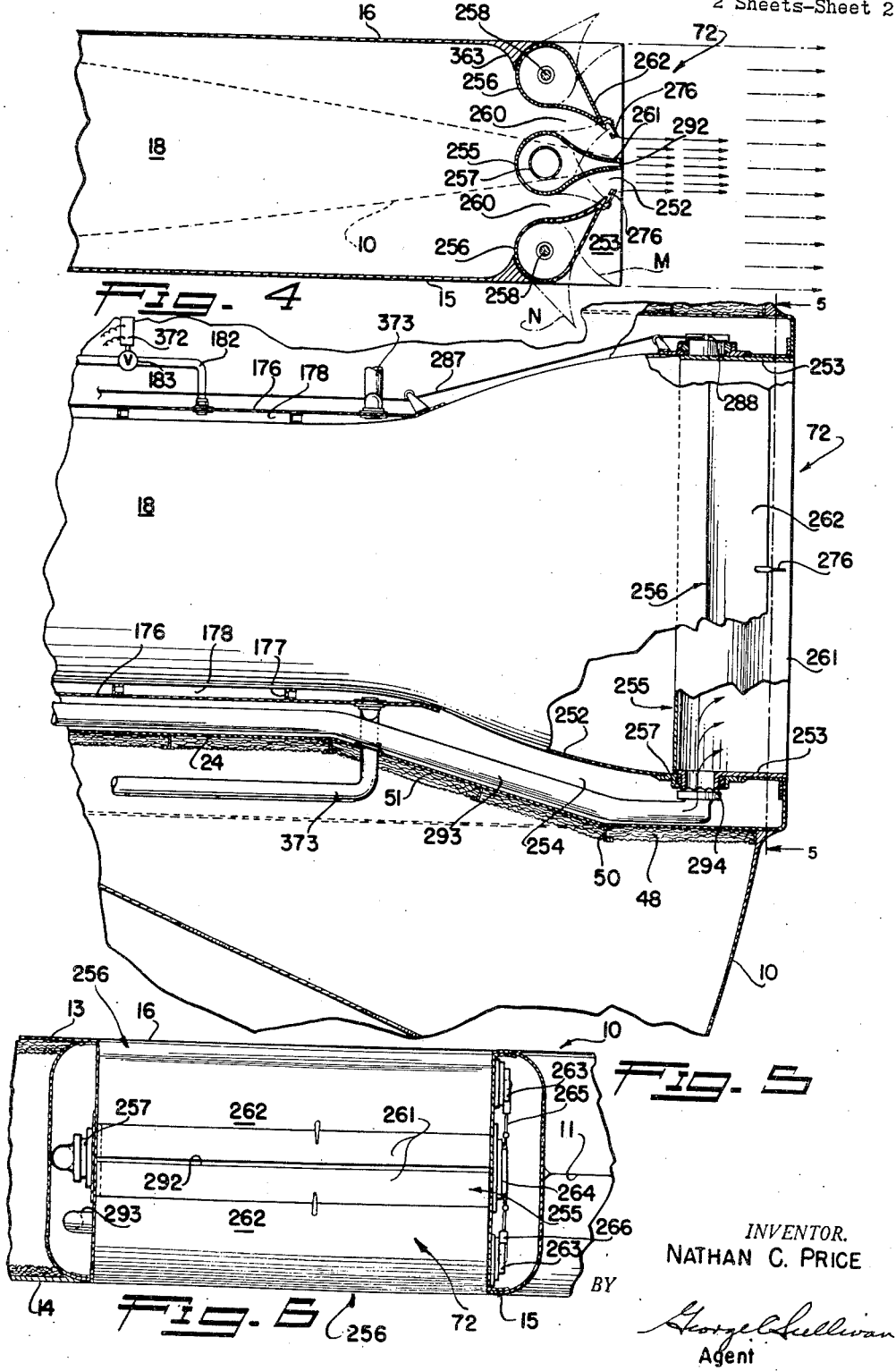

3,038,305
SUBSONIC, SUPERSONIC PROPULSIVE NOZZLE
Nathan C. Price, Mexico City, Mexico, assignor to Lockheed Aircraft Corporation, Burbank, Calif.
Original application Jan. 23, 1953, Ser. No. 332,957. Divided and this application July 3, 1957, Ser. No. 669,880
11 Claims. (Cl. 60—35.55)

This invention relates to the propulsion of aircraft and relates more particularly to propulsive jet outlets or nozzles for high velocity aircraft. It is a general object of this invention to provide a practical, effective and versatile propulsive nozzle of this class.

This application is a division of my copending application Serial Number 332,957, filed January 23, 1953, entitled "High Velocity, High Altitude Aircraft."

Another object of the invention is to provide a propulsive jet outlet or nozzle that operates automatically to adjust or change its operative effective cross-sectional area and configuration to produce the most efficient propulsive jet at various supersonic jet velocities as well as various subsonic jet velocities. The nozzle includes fairings and relatively movable vanes so shaped and constructed and related that automatic movement of the vanes in response to jet flow conditions converts or adjusts the nozzle from a convergent nozzle of the proper capacity for the prevailing jet stream conditions, to obtain the most efficient discharge and utilization of a subsonic propulsive jet, to a convergent-divergent nozzle of the proper effective cross-sectional area and configuration for the most efficient utilization of a supersonic propulsive jet. The nozzle automatically adjusts itself to most effectively discharge the propulsive jet stream under the varying conditions that will occur during the flight program of the aircraft.

Another object of the invention is to provide a propulsive nozzle of this character that is operable to change the direction of the discharging propulsive jet stream and thus obtain a trimming action for the aircraft. The directional control of the nozzle may be effected by a control means or system operable manually as well as by an auto-pilot means.

A further object of the invention is to provide a regulable propulsive jet nozzle of this character that is operable to produce a pitch trimming action by discharging a directed stream of compressed air. In addition to directing the main propulsive jet stream by angularly positionable vanes the nozzle is capable of effecting a pitching moment or trimming action by a directed stream of compressed air.

A still further object of the invention is to provide a propulsive nozzle of this class that is operable to produce a braking action for lessening flight velocity. Certain vanes of the nozzle assembly are operable to positions where they act as effective air brakes.

Other objectives and features of the invention will become apparent from the following detailed description of the typical embodiment of the invention illustrated in the accompanying drawings, in which:

FIGURE 1 is a schematic diagram illustrating the propulsive nozzle means of the invention associated with the overall propulsive system;

FIGURE 2 is a diagrammatic view illustrating elements of the means for positioning the nozzle vanes by manual actuation and auto-pilot actuation to produce directional control of the craft.

FIGURE 3 is an enlarged vertical sectional view of the nozzle with broken lines illustrating various positions of the nozzle vanes;

FIGURE 4 is a fragmentary vertical sectional view through the propulsive nozzle and adjacent propulsive duct with broken lines indicating various positions of the nozzle members or vanes;

FIGURE 5 is a horizontal detailed sectional view of the nozzle with certain parts broken away to appear partly in elevation and partly in horizontal section; and FIGURE 6 is a view taken substantially as indicated by line 6—6 on FIGURE 5 showing the nozzle members in elevation and adjacent parts in vertical cross section.

The propulsive nozzle of the invention is adapted for use in association with practically any reaction type propulsive system where a subsonic and/or sonic stream of air, gas, or air and gas, is to be discharged into the atmosphere to obtain reaction or thrust for propulsive purposes. Furthermore, the nozzle 72 may be used on vehicles and aircraft of different types and classes. In the drawings, the nozzle is shown associated with a propulsion system of a vertical rising and descending aircraft of the type more fully disclosed in my copending application Serial Number 332,957, it being understood this is merely one typical use or application of the invention. The overall propulsive system of the aircraft is shown in a generalized or schematic manner in the drawings and includes a main propulsive duct 18 provided at its forward end with a variable area ram inlet 71. A ducted compressor 65 operates in the duct 18 and is driven by one or more powerplants 66 and 67 arranged external of the duct. The powerplants 66 and 67, which may be of the internal combustion turbo type, are supplied with fuel by valved fuel lines 122. A fuel supply pipe 155 delivers fuel to the compressor unit for ejection from a spinner 166 of the compressor to mix with the air in the duct 18 and to be burned or consumed downstream from the compressor 65. A regenerator space 178 surrounds the aft portion of the duct 18 and is supplied with fuel vapor and liquid fuel by valved control pipes 182 and 373. The vaporized fuel from the regenerator space 178 discharges into the propulsive duct 18 from ports 184 in the wall of the duct for an afterburning action. The ports 184 are spaced downstream from the compressor spinner 166. At least one lateral air duct 130 conveys compressed air away from the compressor 65 and duct 18.

The propulsive jet outlet or nozzle 72 is arranged at the aft end of the duct 18 and is operable to automatically change from a subsonic nozzle to a supersonic nozzle and vice versa in accordance with the flow conditions of the discharging air and gas jet. The nozzle 72 incorporates variable direction features to produce pitching trim during certain phases of the flight program and is operable as an air brake to reduce the velocity of flight under certain conditions. The nozzle 72 is elongated horizontally or spanwise of the aircraft body 10 and, as illustrated in FIGURE 6, the medial spanwise plane of the nozzle is substantially coincident with the plane of the periphery or trailing edge 11. Furthermore, the nozzle 72 is substantially rectangular, having a passage or opening 252 that has a rear terminus defined by vertical side walls 253 and horizontal upper and lower margins. The nozzle passage or opening 252 merges into the aft end of the cylindrical propulsive duct 18 having its walls converging or curving forwardly and inwardly to smoothly join the walls of the duct. Walls 24 extend aft to the trailing edge 11 of the body 10 in spaced generally parallel relation to the duct 18 and nozzle sidewalls 253 to leave spaces 254 useful in containing certain actuating elements of the nozzle 72. As best illustrated in FIGURES 4, 5 and 6, the nozzle 72 includes three movable or pivotal vanes, a center vane 255 and upper and lower vanes 256. The vanes 255 and 256 extend horizontally or spanwise, being in planes parallel with the trailing edge or periphery 11 of the body 10 and are in parallel relation to one another in the horizontaly elongated nozzle opening 252. The three vanes are turnable or rotatable on their longitudinal axes, the center vane 255 having tubular end trunnions 257 journaled in openings in the end walls 253 of the nozzle opening. The upper and lower vanes 256 have end shafts 258 also journaled in the end walls 253. In accordance with the invention the three vanes 255 and 256 are spaced apart vertically, having partially cylindrical bodies concentric with their respective axes of rotation and spaced one from the other to leave two parallel exit or discharge passages 260. The nozzle vanes 255 and 256 are streamlined and of "tear-drop" shape, the central vane 255 having a tapering tail or lip 261 and the upper and lower vanes having similar rearwardly extending lips 262. The rear surfaces of the lip 261 are slightly concave and extend rearwardly from the cylindrical periphery of the vane 255 in converging relation to provide the lip 261 with a rather sharp rear edge. The rear surfaces of the lips 262 on the vanes 256 which face or oppose the vane 255, are concentric with the cylindrical surface of the vane 255 when the nozzle 72 is adjusted to minimum opening while the outer sides of the lips 262 may be flat, the surfaces of the lips 262 converging rearwardly to sharp rear edges. The vanes 255 and 256 are preferably hollow and are constructed of heat-resistant material such as chromium-cobalt-nickel alloy or sintered ceramic-metal combination. The upper and lower walls of the nozzle opening 252 preferably have appropriately shaped flow directing surfaces or fairings 363 to divert or direct the upper and lower regions of the gas and air stream in a manner to flow smoothly over the cylindrical surfaces of the upper and lower nozzle vanes 256. It will be seen that with the nozzle structure thus far described the high velocity propulsive stream or jet is caused to flow through and discharge from the two passages 260 with a minimum of friction and loss and because of the thinness of the central lip 261 these two streams again merge into a single common high velocity or supersonic jet whereby they discharge from the opening 252, as indicated by the arrows in FIGURE 4.

The invention includes means operable to pivot or actuate the vanes 255 and 256 to vary or regulate the effective operational area of the nozzle in accordance with the propulsive jet flow conditions and to alter the direction of the discharging propulsive jet to effect a directional control of the craft. Further, the upper and lower vanes 256 are operable to positions where they form air brakes for reducing the speed of flight and the central vane 255 is utilized as a nozzle for discharging a stabilizing and trimming thrust jet during certain phases of the flight program. The means for operating the nozzle vanes includes horns or operating levers 263, fixed to the shafts 258 of the uper and lower vanes 256 and a similar lever 264 fixed on a trunnion 257 of the central vane 255, see FIGURES 1 and 2. A jack screw 265 is pivoted on the lever 264 and bi-directional electrical screw-jacks 266 are pivoted on the levers 263 of the upper and lower vanes to receive and cooperate with the screw 265. The screw-jacks 266 may be of a conventional type including reversible electric motors driving traveling or rotating nuts meshing with the screw 265, such mechanisms being well known in the art. The screw-jacks 266 are operated or controlled by the positions of the shock waves and margins of the propulsive jet discharging from the nozzle 72. Pitot tubes 276 are secured to the lips 262 of the vanes 256 and have their pressure receiving ends spaced aft from the sharp trailing tips or edges of the lips and facing forwardly. Tubes or lines 267 carry the pressure thus received to pressure diaphragms 268. The diaphragms 268 in turn are operatively connected with spring biased pivoted levers 269 carrying contacts 270. These contacts 270 are connected in a power circuit 271 leading to a generator, battery or other electrical power source 272. The contacts 270 are each spaced between stationary contacts 273 and 274 connected by lines 275 and 277 respectively, with the forward and reverse windings or sides of their respective reversible electric screw-jacks 266.

The mechanism just described for actuating or controlling the vanes 256 of the nozzle means 72 is operable to automatically adjust or position the vanes 256 for the most efficient utilization of the compressed air and gas stream or jet under sonic, transonic and supersonic jet velocity conditions. The Pitot tubes 276 arranged as above described, are affected by or responsive to the positions of the margins of the jet stream discharging through the nozzle. When the velocity conditions are such that the jet of gases exhausting from the nozzle is under-expanded, the margins of the jet move outwardly at the surfaces of the vane lips 262, that is away from the central axis of the nozzle and increased pressure at these margins is sensed by the Pitot tubes 276. The broken line X in FIGURE 3 indicates diagrammatically the margin of an under-expanded jet stream as produced by the shock waves at the nozzle exit. On the other hand, when the jet velocity conditions are such that the jet as it discharges from the nozzle 72 is over-expanded the margins of the jet move inwardly or toward the central axis of the nozzle. The broken line Z in FIGURE 3 indicates diagrammatically a margin of the over-expanded jet as produced by the oblique reflection shock waves at the nozzle exit. It is to be understood that the particular full line positions of the vanes 256 in FIGURE 3 bear no operative or intended relation to the margins X and Z, the lines X and Z being entirely schematic.

The automatic means for operating the nozzle vanes 256 employs or is sensitive to the movement of the margins of the exhausting gas stream jet to position the vanes 256 in accordance with the jet velocity conditions in order to most efficiently utilize the jet in the propulsion of the aircraft. Thus when the jet is under-expanded the margins of the jet move outwardly to apply increased pressure at the Pitot tubes 276 and this pressure acts on the diaphragms 268 to move the contacts 270 against the contacts 273. This in turn energizes the screw-jacks 266 to pivot the vanes 256 to swing their lips 262 outwardly and thus permit further expansion of the exhausting jet stream. However, when the discharging jet is over-expanded the margins of the jet move inwardly away from the surfaces of the vane lips 262 and the Pitot tubes 276 to lessen the pressure on the diaphragms 268 so that the contacts 270 engage the contacts 274. This energizes the screw-jacks 266 to swing the vane lips 262 inwardly into conformance with the margins of the jet. In practice, during relatively stable or normal operating conditions the margins of the jet will move but little relative to the Pitot tubes 276 and the vanes 256 will be relatively stabilized. Referring to FIGURE 3 of the drawings the full line positions of the vanes 256 are the supersonic jet positions and the broken line positions M are the positions assumed by the vanes during supersonic jet operations of the greatest jet velocity. It will be observed that with the upper and lower vanes 256 in the full line positions of FIGURE 3 the vanes define a convergent nozzle passage for the effective discharge and utilization of the subsonic propulsive stream or jet. However, with the upper and lower nozzle vanes 256 in the broken line positions M the fairings 363, the cylindrical upper and lower vanes 256 and their lips 262 define or provide a convergent-divergent nozzle passage or exit for the efficient utilization of the discharging supersonic propulsive jet.

The above described upper and lower nozzle vanes 256 are adapted to be used as dive brakes or air brakes to brake or reduce the translational speed and descent of the craft during certain maneuvers and in the event the speed of flight exceeds the maximum intended speed. The means for utilizing the vanes 256 as air brakes includes what I will term air speed indicators having Pitot tubes 280 arranged to extend from the aircraft body 10 to receive or respond to the relative air speed. Tubes 281 extend from the Pitot tubes 280 to air relays in the form of diaphragms 282 for biasing the switch levers 269 to cause the vanes 256 to move to the positions N. The diaphragms 282 are calibrated or constructed so that the switches or contacts 270 remain under sole control of the diaphragms 268 so long as the intended maximum indicated speed of flight is not exceeded. However, when this speed is exceeded the increased pressure received by the Pitot tubes 280 acts on the diaphragms 282 to actuate the same to close the switches 270 against the contacts 274. Closing of the switches 270 against the contacts 274 energizes the screw-jacks 266 to swing the vanes 256 to the fully extended positions indicated by the broken lines N in FIGURES 3 and 4. When the vanes 256 are in these positions N their lips 262 extend from the body 10 to project into the air stream or slip stream and act as effective air brakes to retard forward flight. The switches 270 may be constructed and arranged for manual operation by the pilot or engineer as well as by the diaphragms 282 and 268.

The three nozzle vanes 255 and 256 are operable to positions to deflect or divert the propulsive air and gas stream from the main propulsive duct 18 for the vertical directional control or pitch control of the craft. It will be observed that with the above described arrangement of the jack-screw 265 connected with the lever 264 of the central vane 255 and the screw-jacks 266 connected with the levers 263 of the upper and lower vanes 256, the screw-jacks may move the vanes 256 without altering the position of the intermediate vane 255. However, upon angular movement of the central vane 255 the screw 265 and the jacks 266 transmit this movement to the upper and lower vanes 256 so that the three vanes move in unison and in the same direction. The means for utilizing the nozzle vanes 255 and 256 for the direction or pitch control of the craft serves to pivot or move one of the vanes, for example the center vane 255, and includes a servo motor 285 for operating a drum 286. Cables 287 extend from the drum 286 and are attached to horns or levers 288 on one of the trunnions 256 of the central vane 255. The servo motor 285 is adapted to be controlled and energized by an automatic pilot 290 as are certain other devices and instrumentalities of the aircraft. In FIGURE 2, I have shown the automatic pilot 290 in a diagrammatic manner and have shown the control or energizing leads 289 for the servo motor 285 extending to the automatic pilot. Automatic pilots of the type controlled by ground station or airborne station radio signals are now well known in the art and any appropriate or selected type of automatic pilot may be used. A manual lever 291 is provided on the drum 286 so that the vanes 255 and 256 may be manually controlled or directed if such is desired or necessary. It will be seen that upon turning the drum 286 in one direction either by the action of the servo motor 285 or by the manual lever 291, the three vanes 255 and 256 are swung to positions where their lips extend downwardly to direct the propulsive jet downwardly and aft to exert a forward and downward pitching moment to the craft to move it downwardly. Upon turning the drum 286 in the other direction by the servo motor 285 or the hand lever 291 the vanes 255 and 256 are moved to positions where they extend upwardly and aft to direct the propulsive jet upwardly so that the craft is directed upwardly.

The nozzle means 72 is further utilized to discharge a pitch trim jet of compressed air to assist in stabilizing or trimming the craft during its vertical ascent and descent. The tail or lip 261 of the central nozzle vane 255 has a discharge opening 292 in its aft end or edge. This opening 292 is horizontally elongated and may extend throughout the length of the vane 255. The vane 255 is hollow and its interior and the interior of its lip 261 form an effective convergent nozzle terminating at the air discharging opening 292. A pipe 293 communicates with a lateral air duct 130 of the propulsive system and extends aft through the space 254 to the central vane 255. A swing joint or rotary coupling 294 connects the rear end of the pipe 293 with a trunnion 257 of the central vane 255 so that air under pressure from the duct 18 and the duct 130 is supplied to the interior of the vane 255. This air under pressure discharges from the opening 292 in the form of a propulsive and stabilizing or trimming jet. During vertical ascent and descent or during takeoff and landing, the thrust produced by this jet of air under pressure discharging from the opening 292 assists in trimming the pitch angle of the craft and, if desired or necessary, the lever 291 or the servo motor 285 may be actuated to direct this trimming jet as conditions require to trim the craft during its vertical ascent and descent. Air under pressure from the ducted compressor 65 supplied to the interior of the central vane 255 as just described, may discharge from the opening 292 during all of the various phases of the flight program and at the times when the main propulsive jet is discharging from the nozzle means 72 the jet of compressed air from the opening 292 augments the main propulsive jet. It will be observed that the air under pressure circulated through and discharged from the central vane 255 serves to cool the vane.

Having described only typical forms of the invention I do not wish to be limited to the specific details herein set forth, but wish to reserve to myself any variations or modifications that may appear to those skilled in the art and fall within the scope of the following claims.

I claim:

1. A propulsive nozzle for discharging a propulsive jet from an aircraft body having a slip stream including a plurality of relatively movable vanes, means for moving certain of the vanes to define a rearwardly convergent nozzle for subsonic propulsive flow and a rearwardly convergent-divergent nozzle for supersonic propulsive jet flow, means responsive to the positions of the margins of the jet streams leaving said certain vanes relative to the trailing edges of the vanes for controlling the vane moving means, and means responsive to the velocity of the relative air flow past the body operable to control the vane moving means to project said certain vanes into the slip stream to serve as air brakes.

2. In an aircraft having a propulsive duct, a propulsive discharge nozzle for the duct including three parallel spaced vanes, at least two of said vanes pivotable about parallel axes, each vane including a substantially cylindrical portion concentric with the pivotal axis of the movable vanes and a rearwardly tapering tail extending aft from the cylindrical portion, and means for moving certain of the vanes about said axes between positions where the cylindrical portions and tails of said vanes define a rearwardly convergent nozzle for the discharge of subsonic flow and positions where they define a rearwardly convergent-divergent nozzle for the discharge of supersonic flow.

3. In an aircraft having a propulsive duct carrying a high velocity flow; a propulsive discharge nozzle for the duct including spaced vanes pivotable about parallel axes, each vane including a substantially cylindrical portion concentric with its pivotal axis and a rearwardly tapering tail extending aft from the cylindrical portion, means for moving certain of the vanes about said axes between positions where the cylindrical portions and tails of said vanes define a rearwardly convergent nozzle for the discharge of subsonic flow and positions where they define a rearwardly convergent-divergent nozzle for the discharge of supersonic flow, said means including screw-jack means for pivoting the vanes, electric circuits for energizing the screw-jack means, and means responsive to the positions of the margins of the jet discharging from the nozzle relative to the trailing edges of the vanes for controlling said circuits.

4. In an aircraft having a propulsive duct carrying high velocity flow, a propulsive discharge nozzle for the duct including spaced vanes pivotable about parallel axes, each vane including a portion concentric with its pivotal axis and a rearwardly tapering tail extending aft from said portion, means for moving certain of the vanes about said axes between positions where the said portions and tails of said vanes define a rearwardly convergent nozzle for the discharge of subsonic flow and positions where they define a rearwardly convergent-divergent nozzle for the discharge of supersonic flow, said means including electric screw-jacks for pivoting the vanes, circuits for energizing the screw-jacks, switches in the circuits, and means responsive to the positions of the margins of the jet discharging from the nozzle relative to the trailing edges of the vanes for operating the switches.

5. In an aircraft having a propulsive duct carrying high velocity flow; a propulsive discharge nozzle for the duct including spaced vanes pivotable about parallel axes, each vane including a cylindrical portion concentric with its pivotal axis and a rearwardly tapering tail extending aft from the cylindrical portion, means for moving certain of the vanes about said axes between positions where the cylindrical portions and tails define a rearwardly convergent nozzle for the discharge of subsonic flow and positions where they define a rearwardly convergent-divergent nozzle for the discharge of supersonic flow, said means including actuators for pivoting said certain of the vanes, pressure actuated devices for controlling the actuators, and pressure taps on the tails of said certain vanes in communication with said devices and arranged to pick up the shock wave pressures at the margins of the discharging jet.

6. A propulsive discharge nozzle for the propulsive duct of an aircraft having a slip stream including diametrically spaced vanes pivotable about parallel axes normal to the direction of the slip stream, said vanes pivotable between positions where they define a rearwardly convergent discharge nozzle for the duct and positions where they define a rearwardly convergent-divergent discharge nozzle for the duct, actuating means for pivoting the vanes, means for controlling the actuating means to move the vanes to said positions, and means responsive to the relative air speed of the craft for actuating the actuating means to move the vanes to positions where they project into the slip stream to act as air brakes.

7. A variable propulsive jet efflux nozzle for a duct conveying an elastic fluid at high velocities comprising two diametrically spaced opposed relatively movable wall members defining a fluid discharge passage, one of said members being pivoted, the up-stream ends of the members being bulbous in cross section, tails on the members tapering downstream from said bulbous ends and having confronting concave surfaces, and means for pivoting said member between a position where said passage is rearwardly convergent and a position where said passage is rearwardly convergent-divergent.

8. A variable propulsive jet efflux nozzle for a duct conveying an elastic fluid at high velocities comprising a plurality of diametrically spaced confronting members defining discharge passages, means supporting the members for relative pivotal movement, the up-stream ends of the members being bulbous in cross section, tails tapering aft from said ends, said tails having confronting concave surfaces, and means for pivoting the members to change the configuration of said passages.

9. A propulsive nozzle for discharging a high velocity jet from an aircraft having an external slip stream, the nozzle including diametrically spaced opposed wall members for defining a discharge passage, means supporting at least one of the members for pivotal movement, the members having bulbous up-stream regions and tails tapering downstream therefrom, the tails having opposing concave surfaces, and means for pivoting said member to change the configuration of said passage.

10. A propulsive nozzle for discharging a high velocity jet from an aircraft having an external slip stream, the nozzle including diametrically spaced opposed wall members for defining a discharge passage, means supporting the members for relative pivotal movement, the members having bulbous upstream regions and tails tapering downstream therefrom, the tails having opposing concave surfaces, means for effecting relative pivoting of the members to change the configuration of said passage, and means responsive to air speed of the aircraft for pivoting at least one member into the slip stream to act as an air brake.

11. A propulsive nozzle for discharging a high velocity jet from an aircraft having an external slip stream, the nozzle including diametrically spaced opposed vane members, the members being spaced to leave discharge passages therebetween, the upstream ends of the members being bulbous in cross section, tails on the members tapering downstream from said ends and presenting concave confronting surfaces, means pivotally supporting the vane members, means for pivoting certain of the members between positions where said passages are rearwardly convergent and positions where said passages are rearwardly convergent-divergent, and means for pivoting at least one of said members to project into the slip stream to act as an air brake.

References Cited in the file of this patent

UNITED STATES PATENTS

| 1,698,822 | Paxton | Jan. 15, 1929 |
| 2,420,323 | Meyer | May 13, 1947 |
| 2,512,790 | Cleveland | June 27, 1950 |
| 2,514,248 | Lombard et al. | July 4, 1950 |
| 2,537,772 | Lundquist et al. | Jan. 9, 1951 |
| 2,551,372 | Haltenberger | May 1, 1951 |
| 2,553,642 | Eaton et al. | May 22, 1951 |
| 2,597,253 | Melchior | May 20, 1952 |
| 2,657,575 | Allen | Nov. 3, 1953 |
| 2,664,700 | Benoit | Jan. 5, 1954 |
| 2,638,348 | Petry | July 13, 1954 |
| 2,770,944 | Jordan | Nov. 20, 1956 |
| 2,799,989 | Kappus | July 23, 1957 |
| 2,802,333 | Price et al. | Aug. 13, 1957 |
| 2,840,326 | Richardson et al. | June 24, 1958 |
| 2,858,668 | Kelley et al. | Nov. 4, 1958 |
| 2,880,575 | Scialla | Apr. 7, 1959 |

FOREIGN PATENTS

| 580,995 | Great Britain | Sept. 26, 1946 |
| 750,420 | Great Britain | June 13, 1956 |
| 764,180 | Great Britain | Dec. 19, 1956 |